United States Patent
Fukushima et al.

(10) Patent No.: US 6,198,570 B1
(45) Date of Patent: *Mar. 6, 2001

(54) OPTICAL FILTER, MANUFACTURING METHOD THEREOF, AND OPTICAL AMPLIFIER EQUIPPED WITH SAID OPTICAL FILTER

(75) Inventors: Masaru Fukushima, Ichihara; Haruki Ogoshi; Hijiri Nimura, both of Chiba, all of (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/259,305

(22) Filed: Mar. 1, 1999

Related U.S. Application Data

(63) Continuation-in-part of application No. 08/997,409, filed on Dec. 23, 1997, now Pat. No. 5,933,552.

(30) Foreign Application Priority Data

Apr. 5, 1996 (JP) .................................................... 8-129083

(51) Int. Cl.[7] .............................. G02B 6/28; G02B 26/00; H01S 3/00
(52) U.S. Cl. ............................ 359/337; 385/24; 385/141; 359/130; 359/341
(58) Field of Search ...................... 385/24, 141; 359/130, 359/133, 134, 160, 161, 174, 176, 177, 337, 341

(56) References Cited

U.S. PATENT DOCUMENTS

| | | | |
|---|---|---|---|
| 5,083,874 | * | 1/1992 | Aida et al. ............................... 359/24 |
| 5,115,338 | * | 5/1992 | Huber .................................... 259/337 |
| 5,311,347 | * | 5/1994 | Kubo et al. ........................... 359/176 |
| 5,340,979 | * | 8/1994 | Baney et al. ...................... 250/214 B |
| 5,838,487 | * | 11/1998 | Nilsson et al. ........................ 359/341 |
| 5,933,552 | * | 8/1999 | Fukushima et al. ................... 385/24 |

FOREIGN PATENT DOCUMENTS

| | | |
|---|---|---|
| 4-147114 | 5/1992 | (JP) . |
| 6-75254 | 5/1994 | (JP) . |
| 97/40559 | * 10/1997 | (WO) . |

OTHER PUBLICATIONS

Tachibana, Laming, Morkel, Payne Erbium–Doped Fiber Amplifier with Flattened Gain Spectrum IEEE Photonics Technology Letters, vol. 3, No. 2, Feb. 1991.

* cited by examiner

*Primary Examiner*—Nelson Moskowitz
(74) *Attorney, Agent, or Firm*—Lacasse & Associates

(57) ABSTRACT

A method of manufacturing an optical filter that can restrain the wavelength dependence of the gain of an optical amplifier. The input signal light power, output power of pump light source (8), and the output signal light power of an optical amplifier (4) are set to the power values used for optical communication systems, and the total power of the simulation input light of a plurality of wavelengths ($\lambda 1, \lambda 2, \ldots \lambda n$) from light sources (1a) and an input light (probe light) from light sources (1m) are set equal to the total power of the input signals of a plurality of wavelengths used in wavelength division multiplex transmission systems. In this condition, the input light are multiplexed and are launched into optical amplifier (4), and the amount of attenuation is variably adjusted so that the output power from optical amplifier (4) in correspondence to the probe light will be within the range determined by the maximum and minimum of the output power corresponding to the simulation input light to determine the attenuation amount corresponding to the wavelength of the probe light. The above operation is repeated upon varying the wavelength of the probe light, and loss spectrum of the optical filter is set to the loss spectrum of the attenuation amounts in one-to-one correspondence with the respective wavelengths.

8 Claims, 8 Drawing Sheets

OPTICAL FILTER, MANUFACTURING METHOD THEREOF, AND OPTICAL AMPLIFIER EQUIPPED WITH SAID OPTICAL FILTER

This is a continuation-in-part application of Ser. No. 08/997,409 filed Dec. 23, 1997, now U.S. Pat. No. 5,933,552 issued Aug. 3, 1999.

FIELD OF THE INVENTION

The present invention relates to a method of manufacturing an optical filter to be provided in an optical amplifier that uses an erbium-doped fiber excited by a pump light source. The present invention also concerns the optical filter manufactured by this method and an optical amplifier equipped with this optical filter.

BACKGROUND OF THE INVENTION

The realization of optical amplifiers that use optical fibers doped with erbium (EDFA; erbium-doped fiber amplifier) in recent years has made it possible to directly amplify light signals in the 1.55 μm wavelength band without conversion into electrical signals; high-capacity, long-distance communication is thereby practicable in the field of optical communication. Meanwhile, communication using wavelength division multiplexing (WDM), in which light signals of different wavelengths are transmitted by a single optical fiber, is being performed to expand the communication capacity of optical communication, and the application of the abovementioned erbium-doped fiber amplifier to an optical communication system using this wavelength division multiplexing technique is anticipated to expand the communication capacity further and realize long-distance transmission by the wavelength division multiplex technique.

In cases where an optical amplifier is to be applied to an optical communication system that uses wavelength division multiplexing, it is important that the optical amplifier amplify signal light of different wavelengths in a batch. However, it is well known that the gain of an optical amplifier using an erbium-doped fiber (EDFA) is wavelength dependent and thus gain difference arises among the wavelength division multiplex signal channels when wavelength division multiplex signals are amplified with an EDFA. The signal-to-noise ratios will thus differ among the wavelength division multiplex signal channels when an EDFA is applied to a wavelength division multiplexed optical communication system. Especially in the case of an optical communication system (optical transmission system) formed by connecting a plurality of EDFA's in a cascading manner between optical fibers for optical signal transmission, the signal-to-noise ratio of a signal of a channel with a small gain will deteriorate excessively in comparison to the signal-to-noise ratios of other channels and such differences in gain among wavelength division multiplex signal channels for different wavelengths restrict the transmission distance of a wavelength division multiplex type optical transmission system.

In general, an EDFA provides gain in a wavelength range of approximately 40 nm from 1525 nm to 1565 nm. However, it is known that with an EDFA that is supplied with adequate excitation power, the gain at a wavelength near 1530 nm will be 6 dB to 12 dB greater than the gain at a wavelength near 1550 nm. The gain is also non-flat in the range, 1540 nm to 1560 nm, where there are wavelength-dependent gain slopes and ripples.

Thus, in order to eliminate the wavelength dependence of the gain of an optical amplifier that uses an erbium-doped fiber, the insertion of an optical filter in the optical amplifier for flattening the gain characteristics of the optical amplifier has been considered. A method for setting the loss spectrum of the optical filter to be inserted in an optical amplifier that uses an erbium-doped fiber (EDFA) is described in "1995 Optical Amplifiers and Their Applications in a publication dated Jun. 15, 1995, Davos Switzerland, 1995 Technical Digest Series Volume 18 Sponsored by the Optical Society of America in a presentation entitled EDFA gain equalization with fiber filter for WDM systems by Eric Saint Georges denoted as ThD5 in the table of contents" (Reference 1). According to Reference 1, the loss spectrum of the optical filter is set so as to flatten the ASE (amplified spontaneous emission) when the input signal light is not input into the EDFA.

However, the gain spectrum of an EDFA is not only dependent on the wavelength of the input signal but is also dependent on the power of the input signal light and the excitation power of the pump light source. For example, the results shown in FIGS. 12 and 13 were obtained when the present applicant investigated the effects of the input signal light power and the length of the erbium-doped fiber on the wavelength division multiplex amplification characteristics of an EDFA excited at a wavelength of 0.98 μm and a power of 65 mW.

The results of measuring the relationship between the input light power and the output light power upon input of signal light of the four different wavelengths of 1533 nm, 1539.5 nm, 1549 nm, and 1557 nm into an optical amplifier formed with an erbium-doped fiber with a length of 5 m is shown in FIG. 12 and those for an optical amplifier formed with an erbium-doped fiber with a length of 7 m is shown in FIG. 13. In either case, the input signal light power was varied in the range −16 dBm–30 dBm for each signal light, and the output signal light power for each input signal light power was measured with an optical spectrum analyzer.

As is clear from these Figures, for both the optical amplifier with an erbium-doped fiber with a length of 5 m and that with a fiber with a length of 7 m, not only did the output signal light power for a given input signal light power differ with the wavelength of the input signal light but the output signal light power also depended on the level of the input signal light power, and the proportion of the gain of the optical amplifier which differs according to the wavelength of the signal light, in other words, the gain difference also differed according to the input signal light power.

To clarify these differences further, the maximum gain difference of the optical amplifier due to differences in input signal light power (the width of the dispersion of the amplifier gain which differs with the wavelength of input signal light) was determined for each of the optical amplifiers with an erbium-doped fiber of a length of 5 m and 7 m on the basis of the measurement results shown in FIGS. 12 and 13. The results that were obtained are shown in FIG. 14.

As is clear from FIG. 14, for an input signal light power for example of −26 dBm, which is typically used for optical communication by the wavelength division multiplex technique, the maximum gain difference of an optical amplifier with an erbium-doped fiber of 5 m length is approximately 6.5 dB and the maximum gain difference of an optical amplifier with an erbium-doped fiber of 7 m length is also greater than 6 dB. Besides these dependencies of the optical amplifier gain on the input signal light power and length of erbium-doped fiber, it is also known that the gain depends on other factors such as the power of the pump light source provided in the optical amplifier.

Thus the gain spectrum of an EDFA will differ for the case where input signal light is not input into the EDFA as indicated in Reference 1 and the case where the input signal light is actually input into the EDFA, and for example, when an input signal light is input into an EDFA, the power of the pump light source must be increased to flatten the gain spectrum. Thus although power correction of the pump light source is performed in addition to the insertion of an optical filter in the EDFA in Reference 1, there is a problem in that the amount of this correction cannot be estimated beforehand.

The present invention has been made in view of the above problems and the objects thereof and provides a method of manufacturing an optical filter to be used in an optical amplifier that can realize a wavelength division multiplex type optical transmission system that can perform long-distance transmission and provides an optical filter manufactured by said method and an optical amplifier equipped with said optical filter.

SUMMARY OF THE INVENTION

In order to achieve the above object, the present invention presents means with the following arrangements for solving the above problems. That is, the present invention provides in a method of manufacturing an optical filter to be used in an optical amplifier equipped with an erbium-doped fiber that is excited by an pump light source, in a wavelength division multiplex transmission system, comprising the steps of:

setting the input signal light power of the optical amplifier, output power of the pump light source, and output signal light power of the optical amplifier respectively, to power values used during operation in a communication system and setting the total power of a plurality of test input light, which includes simulation input light of a plurality of wavelengths and input light of one of the wavelengths in the communication band of the wavelength division multiplex transmission system, equal to the total power of communication input signals of a plurality of wavelengths used in the wavelength division multiplex transmission system, obtaining an attenuation amount in one-to-one correspondence to the respective wavelengths of the specified bands in a wavelength multiplex transmission band so that the output power goes into the setting power values; and setting a loss spectrum to become a loss spectrum of the attenuation amount in one-to-one correspondence to the respective wavelengths of the communication band.

The optical filter of the present invention is characterized in being manufactured by the above manufacturing method.

Also, the first embodiment of the invention of an optical amplifier presents in an optical amplifier for wavelength division multiplex communication that uses an erbium-doped fiber excited by a pump light source, an optical amplifier characterized in that the optical filter of the above arrangement is inserted in the light path that passes through the erbium-doped fiber.

Furthermore, the second embodiment of the invention of an optical amplifier presents in an optical amplifier for wavelength division multiplex communication that uses an erbium-doped fiber excited by a pump light source, an optical amplifier characterized in that a single-mode optical fiber is connected to the erbium-doped optical fiber and the optical filter of the above arrangement is inserted in this single-mode optical fiber.

With the invention of the above arrangement, since signal light input into the optical amplifier is performed in the condition where the input signal light power, pump light source output power, and output signal light power of the optical amplifier have been respectively set to the power values used during actual communication and the total power of a plurality of test input light, that include simulation input light of a plurality of wavelengths and input light of one of the wavelengths in the communication band, has been set equal to the total power of the actual communication input signals of a plurality of wavelengths used in wavelength division multiplex communication, the gain spectrum of the optical amplifier will be nearly the same as that during use for communication.

Thus the output power output from the optical amplifier for the input light, among the test input light, of a wavelength in the communication band will be the output power during use for communication of said input light of a wavelength in the communication band, and the attenuation amount corresponding to the wavelength of the input light of the wavelength in the communication band during actual use for communication can be determined by determining, by variable adjustment, the amount of attenuation at which said output power will be within or equal to a preset range or preset value within the range determined by the maximum and minimum output power output from the optical amplifier in correspondence to the simulation input light.

And since this determination of attenuation amount is repeated to determine attenuation amounts in one-to-one correspondence with the wavelengths of the specified band within the wavelength division multiplex communication band and an optical filter is manufactured whose loss spectrum is set to the loss spectrum of these attenuation amounts in one-to-one correspondence with the wavelengths of the specified band, an optical filter is manufactured whose loss spectrum is set to that necessary for actual use in communication, and by inserting this optical filter into an optical amplifier, the wavelength dependence of the gain of the optical amplifier will be suppressed.

That is, by the present invention, since an optical filter is manufactured by setting the input signal light power, pump light source output power, and output signal light power of the optical amplifier respectively to the power values used during communication and setting the total power of a plurality of test input light, that include simulation input light of a plurality of wavelengths and input light of one of the wavelengths within actual communication band, equal to the total power of the actual communication input signals of a plurality of wavelengths used in wavelength division multiplex communication, then determining, in the above settings, the attenuation amounts that are in one-to-one correspondence with each wavelength of the specified band within the wavelength division multiplex communication band, and then setting the loss spectrum of the optical filter to the loss spectrum of said attenuation amounts, the wavelength dependence of the gain of the optical amplifier can be flattened in accordance with the optical amplifier usage conditions, such as the input signal light power, etc. during actual wavelength division multiplex communication. An optical filter can thus be manufactured for which the problem of wavelength dependence of the optical amplifier gain, that occurs in actual wavelength division multiplex communication, is solved without fail.

Thus the optical filter made by this method will be an excellent optical filter that can definitely solve the problem due to the wavelength dependence of the optical amplifier gain that occurs in wavelength division multiplex communication and the optical amplifier equipped with this optical fiber will be an excellent optical amplifier with hardly any wavelength dependence of the gain. Also by applying such an optical amplifier to wavelength division multiplex communication, an excellent optical amplifier can be provided which enables the realization of long-distance transmission by the wavelength division multiplex method and the construction of an excellent optical communication system that enables high-capacity, long-distance communication.

BRIEF DESCRIPTION OF THE DRAWINGS

Exemplary embodiments of the invention will now be described in conjunction with the drawings, in which.

DETAILED DESCRIPTION

Figure 1:
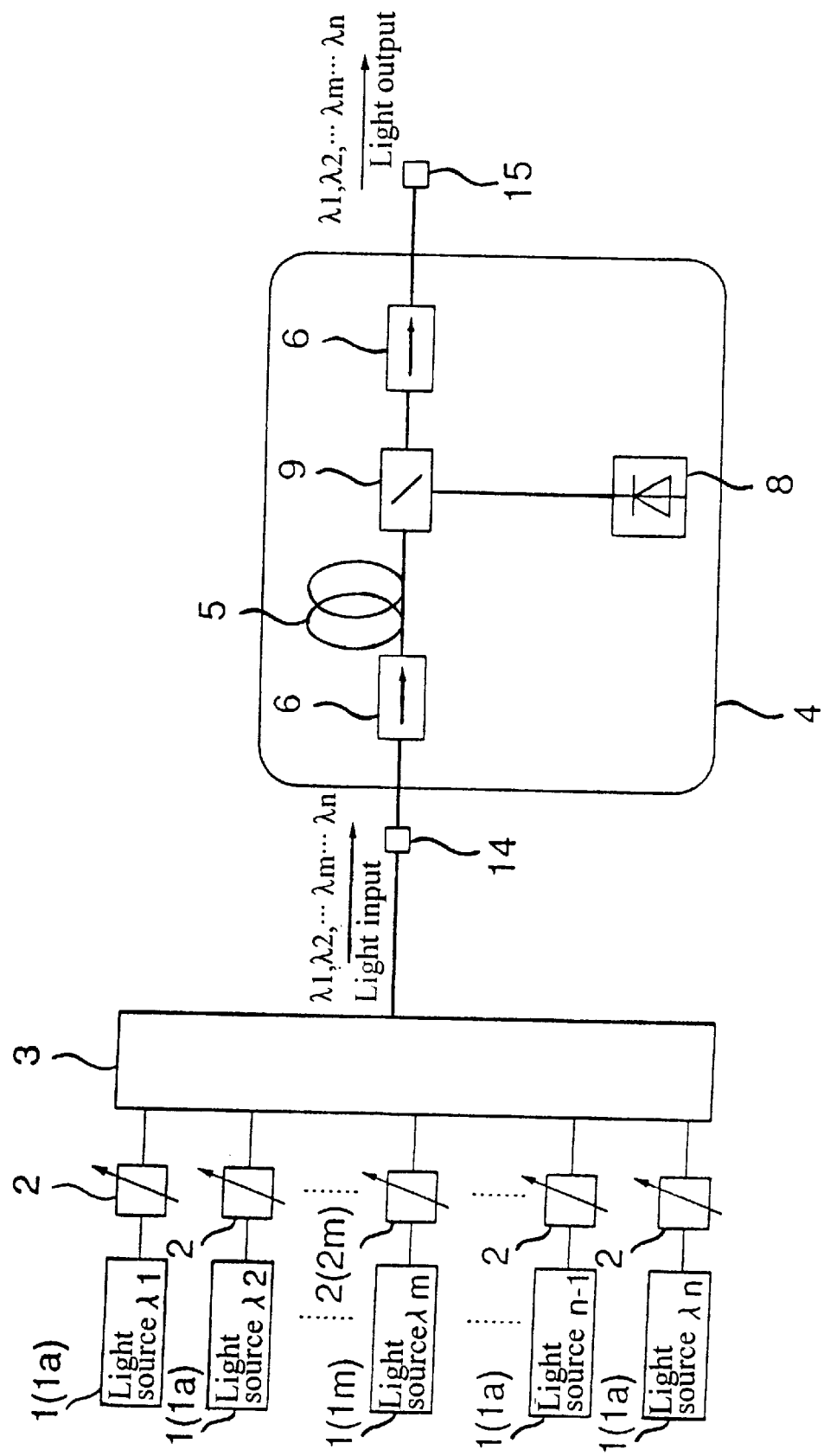
FIG. 1 is a block diagram of the optical filter loss spectrum setting device used in one embodiment of the optical filter manufacturing method by the present invention.
Figure 2:
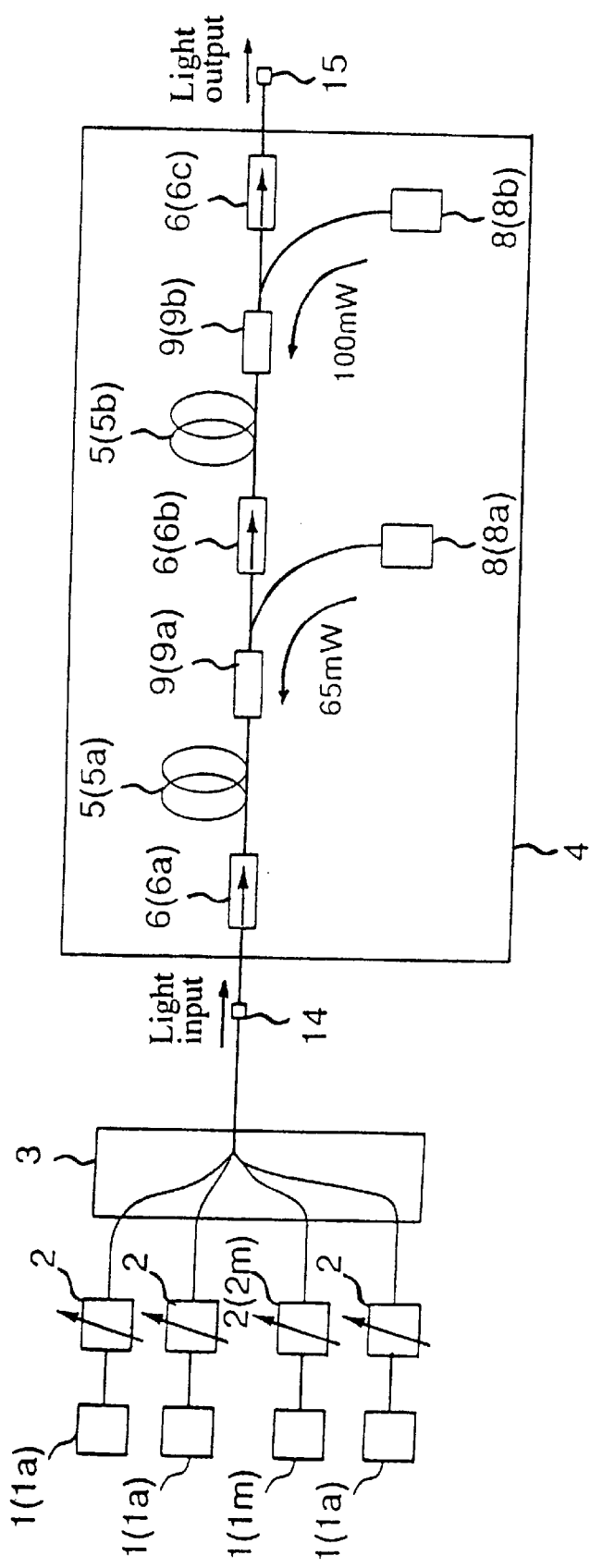
FIG. 2 is a block diagram of a specific example of the optical filter loss spectrum setting device shown in FIG. 1.

In order to explain the present invention in more detail, embodiments of the invention shall now be described with reference to the drawings. An optical filter loss spectrum setting device, used in one embodiment of the optical filter manufacturing method by the present invention is shown in FIGS. 1 and 2. FIG. 1 shows the optical filter loss spectrum setting device used in the present embodiment in a general manner while FIG. 2 shows this device in a more specific manner.

In these figures, each of a plurality of light sources 1 is connected to the input end of an n×1 coupler 3 (where n is the number of light sources 1) and an optical amplifier 4 is connected to the exit end of the n×1 coupler 3. In FIG. 2, there are four light sources 1 and the n of n×1 coupler 3 is equal to four. Light sources 1 are the light sources that emit the plurality of test input light signals which include the simulation input light of a plurality of wavelengths and input light of one of the wavelengths within the actual communication band that are to be input into optical amplifier 4. Among light sources 1, light source 1$m$ is the light source that emits the probe light that is the input light of one of the wavelengths within actual communication band (input light of wavelength in communication band) and is formed from a variable wavelength light source. Among light sources 1, the light sources 1$a$ besides light source 1$m$ are light sources that emit the simulation input light which mutually differ in wavelength. The device of FIG. 2 is provided with three light sources 1$a$.

The abovementioned optical amplifier 4 is comprised of an optical isolator 6, an erbium-doped fiber 5, a wavelength division multiplex branching filter 9, and a pump light source 8. As shown in FIG. 2, the optical amplifier 4 used in the present embodiment has two circuits, respectively comprised of erbium-doped fiber 5, wavelength division multiplex branching filter 9, and pump light source 8, and these circuits are connected in series.

Pump light sources 8 (8$a$, 8$b$) are light sources that emit the radiation that excite erbium-doped fibers 5 (5$a$, 5$b$). Optical amplifier 4 shown in FIGS. 1 and 2 is thus arranged as a backward pumping configuration in which the excitation light from pump light sources 8 (8$a$, 8$b$) are injected to erbium-doped light fibers 5 (5$a$, 5$b$) via wavelength division multiplex branching filters 9 (9$a$, 9$b$) to amplify the signal light. Pump light source 8$a$ at the first stage of FIG. 2 is a 9.98 $\mu$m excitation laser diode that is driven to emit power of 65 mW. Meanwhile, pump light source 8$a$ at the second stage is a 1.48 $\mu$m excitation laser diode that is driven to emit 100 mW of power.

In the optical amplifier 4, optical isolators 6 (6$a$, 6$b$, 6$c$) are interposed between erbium-doped fibers 5 (5$a$, 5$b$), and the signal light input into the optical amplifier 4 are restricted in the direction of transmission by isolators 6 and thereby transmitted from the input end 14 side to output end 15 side of optical amplifier 4. Furthermore, a light receiving device (not shown), such as an optical spectrum analyzer, etc., for detecting the output power of the respective test input light output from output end 15 of the optical amplifier 4 is connected to output end 15 of the optical amplifier 4.

The optical filter loss spectrum setting device used in the present embodiment is arranged as described above, and the optical filter manufacturing method of the present embodiment that uses this device shall now be described. First the input signal light power, output light power of pump light sources 8, and output signal light power of optical amplifier 4 are respectively set to the power values used for communication. Also, the total power of the plurality of test input light, that include the simulation input light of a plurality (three in FIG. 2) of wavelengths emitted by light sources 1a and the single probe light emitted by light source 1m, is set equal to the total power of the actual communication input signals of a plurality of wavelengths used in wavelength division multiplex communication.

Generally with a wavelength division multiplex transmission EDFA used for optical communication by the wavelength division multiplex method, the input signal light power, the power of the pump light source used for the EDFA, and the necessary output signal light power are known, and in the present embodiment, the input signal light power, output power of pump light sources 8, and output signal light power of optical amplifier 4 are set to these known power values. The total power of the test input light is set equal to the abovementioned input signal light power of the EDFA to thereby set the total power of the plurality of test input light equal to the total power of the actual communication input signals of a plurality of wavelengths used in wavelength division multiplex communication.

In many cases, $\lambda 1$, $\lambda 2$, ..., $\lambda n$ are located within the usage communication wavelengths. The respective power of each test input light, Pin ($\lambda 1$), Pin ($\lambda 2$), ..., Pin ($\lambda n$) [dBm] are sometimes set equal to the probe light Pprobe ($\lambda m$) [dBm]. In other words, probe light is arranged to equal level of test light, Pprobe ($\lambda m$)=Pin ($\lambda m$). In this preferred embodiment, the input power of the respective test input light is set to be equal to −26 dBm. Furthermore, in this preferred embodiment a number of test input light signals is equal to the number of using light signals in transmission, and the test input light is designed so that it has an oscillation spectrum of a wide band.

The plurality of test input light in the above condition are then mixed and wavelength division multiplexed by n×1 coupler 3, and then are launched into the amplifier 4. The respective output power of the test input from the amplifier 4, Pout ($\lambda 1$), Pout ($\lambda 2$), ..., Pout ($\lambda n$) [dBm] are determined by the light receiving instrument connected to the output end 15 of the amplifier 4. And the output power of the maximum level, Pmax [dBm], and that of minimum level, Pmin [dBm], are determined.

And the attenuation amount of wavelength ($\lambda m$) was obtained so that the Pout ($\lambda m$) [dBm] outputted from the optical amplifier 4 of the probe light of the above mentioned test input light moves in a range between the maximum and the minimum of power 1 of the output light of the abovementioned simulation input light, that is, so that Pmin<Pout ($\lambda m$)<Pmax. This attenuation amount may be changed by changing the output power itself of the light source 1m with the drive current of the light source 1m changed, by changing the attenuation amount of a variable attenuator with the corresponding variable attenuator secured between the light source and an n×1 light coupler 3, or may be obtained on the basis of measured value of a light receiving device (not illustrated) such as an optical spectrum analyzer, etc., connected to the output end 15 of the optical amplifier 4.

The above determination of attenuation amount by variable adjustment of optical attenuator is then repeated in likewise manner with changing the wavelength at a fixed interval for example, using light source 1m such as wavelength tunable light source. And the attenuation amounts of respective wavelengths of the are specified within the actual communication bands. The respective attenuation amount of each wavelength contributes to the loss of each wavelength of a filter. An optical filter is then manufactured with specified loss spectrum based on above manner.

To manufacture the optical filter for gain flattening at a wavelength around 1530 nm, test light of wavelengths of 1539.5 nm, 1549 nm, and 1557 nm were utilized respectively, using light sources 1a. As for the probe light, wavelength range 1528 nm to 1538.5 nm were launched into the amplifier 4, changing the wavelength at an interval of 0.5 nm at light source 1m. These lights were multiplexed and input into the amplifier 4 to estimate the loss spectrum of the optical filter. For the manufacture of an optical filter for gain flattening at a wavelength around 1540 nm, light of a wavelength around 1540 nm, light of a wavelength of 1533 nm, 1549 nm, and 1557 nm were used as test input light, the wavelength was changed from 1538.5 nm to 1546 nm for the probe light, and these lights were multiplexed and input into the amplifier 4 to estimate the loss spectrum of the optical filter. For the manufacture of an optical filter for gain flattening at a wavelength around 1560 nm, light of a wavelength of 1540 nm, light of a wavelength of 1533 nm, 1541 nm, and 1549 nm were used as test input light, the wavelength was changed from 1556 nm to 1561 nm for the probe light, and these lights were multiplexed and input into the amplifier 4 to estimate the loss spectrum of the optical filter.

To manufacture an optical filter for gain flattening at a wavelength of around 1530 nm, light of a wavelength of 1539.5 nm, 1549 nm, and 1557 nm respectively was emitted as simulation input light from light sources 1a, and for the probe light, light in the wavelength range 1528 nm to 1538.5 nm was emitted upon changing the wavelength at an interval of 0.5 nm at light source 1m, and the simulation input light and probe light was multiplexed and input into optical amplifier 4. For the manufacture of an optical filter for gain compensation at a wavelength of around 1540 nm, light of a wavelength of 1533 nm, 1549 nm, and 1557 nm was used as simulation input light, the wavelength was changed from 1538.5 nm to 1546 nm for the probe light, and this light was input into optical amplifier 4 to set the loss spectrum of the optical filter. For the manufacture of an optical filter for gain compensation at a wavelength of around 1560 nm, light of a wavelength of 1533 nm, 1541 nm, and 1557 nm was used as simulation input light, the wavelength was changed from 1556 nm to 1561 nm for the probe light, and this light was input into optical amplifier 4 to set the loss spectrum of the optical filter.

Figure 3:
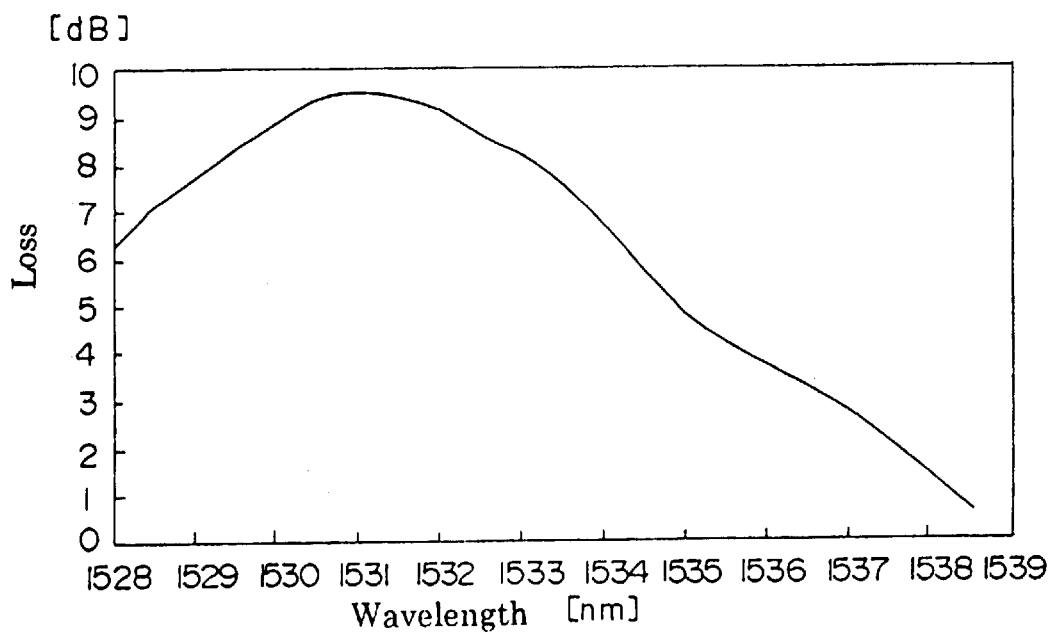
FIG. 3 is a graph which shows the optical filter loss spectrum at a wavelength band of 1530 nm which has been set by the optical filter loss spectrum setting device of FIG. 2.
Figure 4:
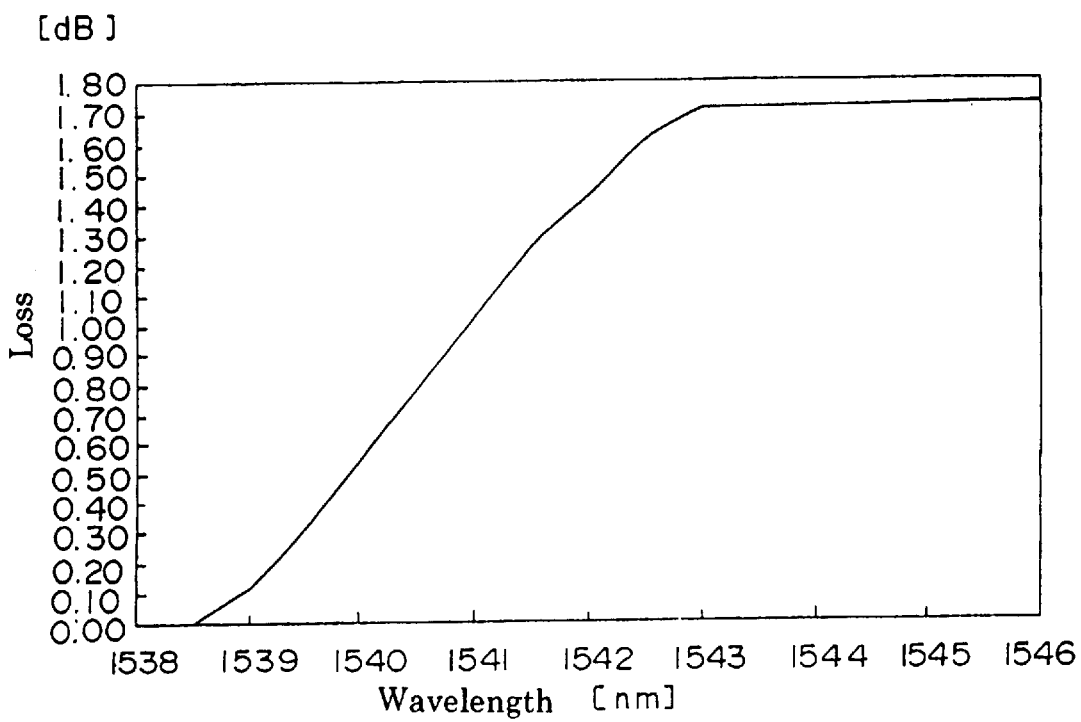
FIG. 4 is a graph which shows the optical filter loss spectrum at a wavelength band of 1540 nm which has been set by the optical filter loss spectrum setting device of FIG. 2.
Figure 5:
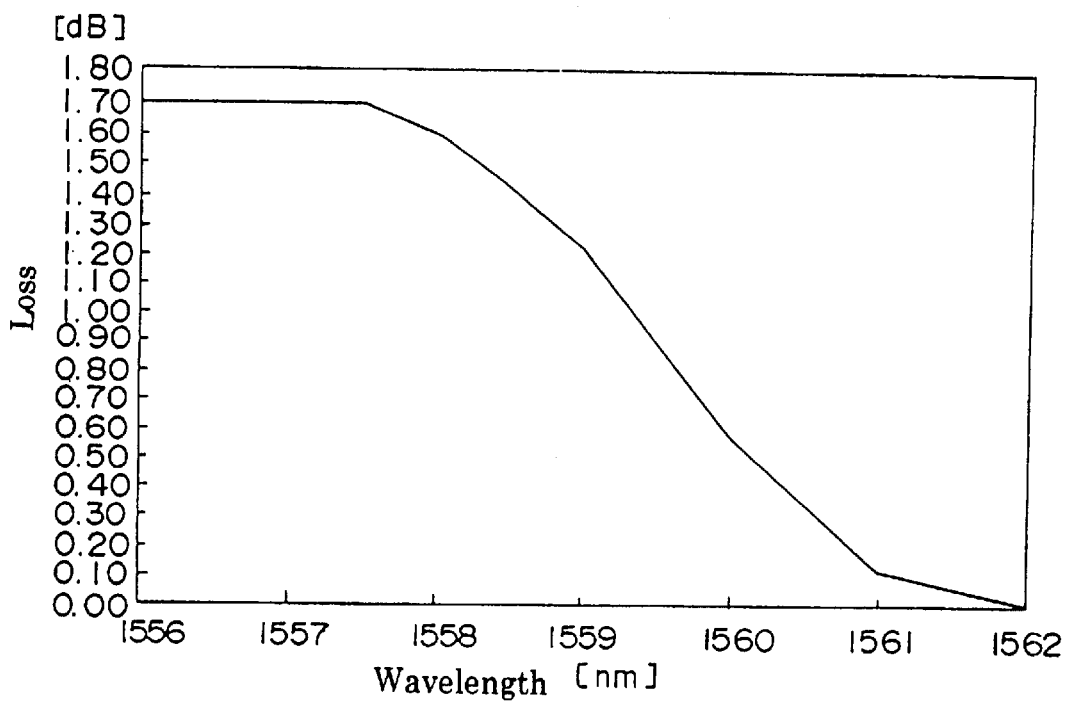
FIG. 5 is a graph which shows the optical filter loss spectrum at a wavelength band of 1560 nm which has been set by the optical filter loss spectrum setting device of FIG. 2.
Figure 6:
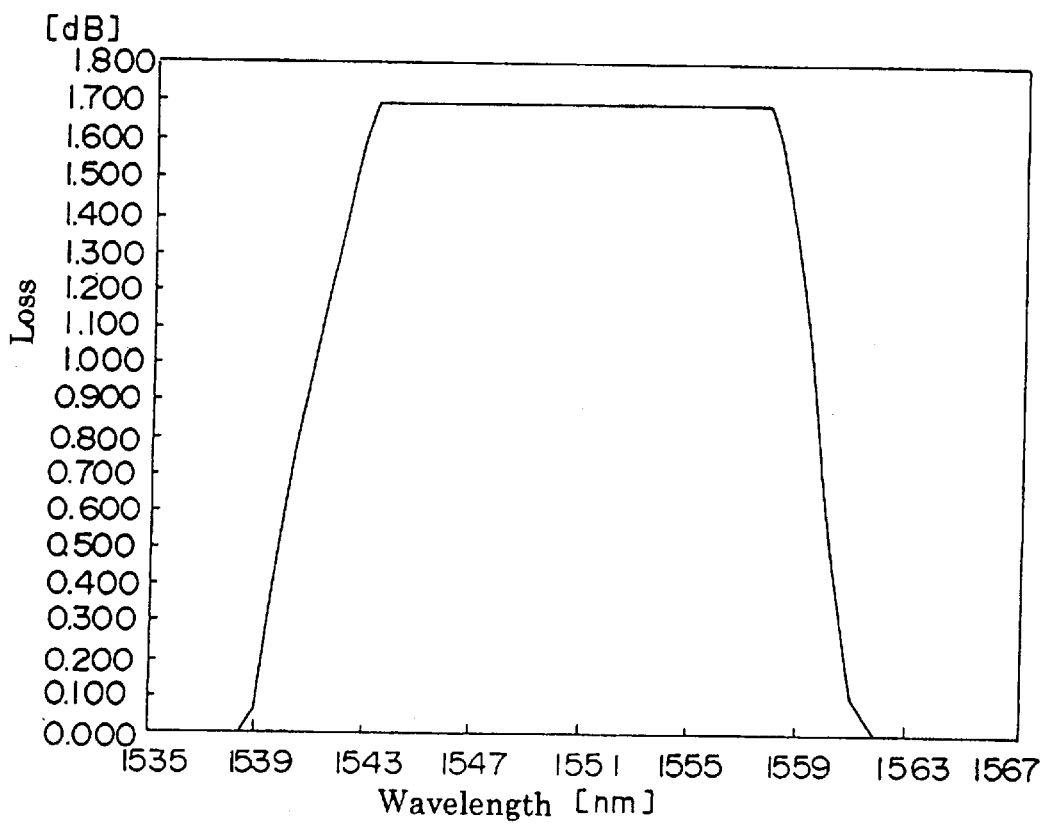
FIG. 6 is a graph which shows the loss spectrum of a single optical filter formed to have the characteristics of an optical filter with the loss spectrum of FIG. 4 and an optical filter with the loss spectrum of FIG. 5.

FIGS. 3 to 6 show the shapes of the loss spectra of optical filters manufactured using the specific optical filter loss spectrum applied to the instrument shown in FIG. 2. FIG. 3 shows the shape of the loss spectrum of the optical filter for gain flattening at a wavelength band of 1530 nm which was manufactured by applying the abovementioned loss spectrum around 1530 nm to the filter. FIG. 4 shows the shape of the loss spectrum of the optical filter for gain flattening at a wavelength band of 1540 nm which was manufactured by applying the abovementioned loss spectrum around 1540 nm to the filter, and FIG. 5 shows the shape of the loss spectrum of the optical filter for gain flattening at a wavelength band of 1560 nm which was manufactured by applying the abovementioned loss spectrum around 1560 nm to the filter. FIG. 6 shows the shape of the loss spectrum of an optical filter in which the optical filter of FIG. 4 and the optical filter of FIG. 5 are formed as one optical filter.

As shown by these figures, the optical filters for gain flattening at the respective wavelength bands indicate losses that vary in correspondence to the respective wavelengths. That is, with the optical filter with the loss spectrum shape shown in FIG. 3, the loss peak is located near a wavelength of 1531 and the peak loss is approximately 9.5 dB. With the optical filter with the loss spectrum shape shown in FIG. 4, the loss is constant (1.7 dB) at wavelengths longer than 1543 nm, and with the optical filter with the loss spectrum shape shown in FIG. 5, the loss is constant at 1.7 dB at wavelengths shorter than 1557.5 nm. Thus the optical filter made by forming one optical filter from the optical filters with the loss spectrum shapes shown in FIGS. 4 and 5 has a spectrum shape in which the loss is constant at 1.7 dB in the wavelength range 1543 nm to 1557.5 nm and is zero at wavelengths shorter than 1539 nm and wavelengths longer than 1562 nm as shown in FIG. 6.

In actually manufacturing optical filters which exhibit loss spectra such as those shown in these figures after setting the loss spectra of the respective optical filters to those shown, the optical filters can be manufactured upon providing some leeway in the loss spectra in view of the margins of optical filter manufacture, the operation conditions of the EDFA, etc. By doing so, the optical filter with the loss spectrum shown in FIG. 3 will have a loss peak of a value in the range 6 dB to 12 dB in the wavelength range 1529 nm to 1534 nm for example, and the optical filter with the loss spectrum shown in FIG. 6 will have a loss of 3±1.5 dB in wavelength range 1543 nm±3 nm to 1558 nm±3 nm and a loss of 1 dB or less in other wavelength ranges.

Figure 7:
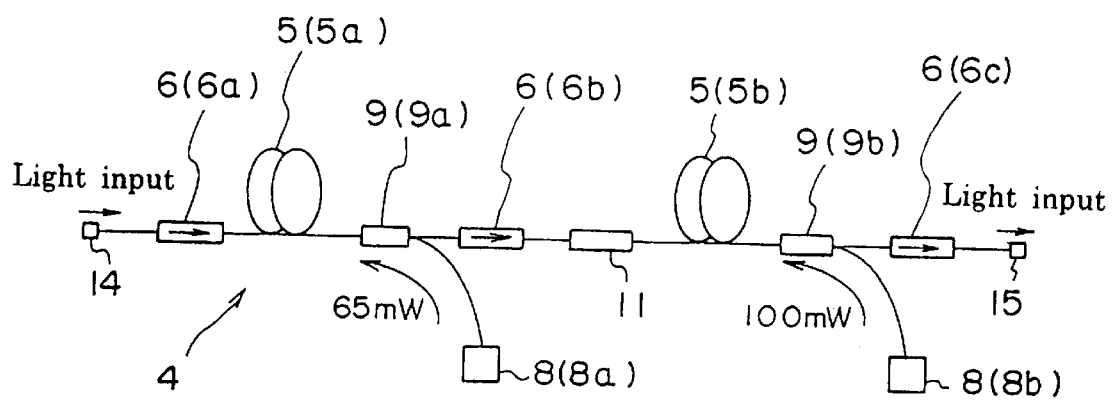
FIG. 7 is a block diagram which shows an optical amplifier to which an optical filter, manufactured by the optical filter manufacturing method of the present embodiment, is applied.

FIG. 7 shows an example of an optical amplifier arranged with an optical filter 11 manufactured by the optical filter manufacturing method of the embodiment described above. The optical amplifier 4 shown in said figure is arranged in nearly the same manner as the optical amplifier shown in FIG. 2. The characteristic feature of the optical amplifier 4 shown in FIG. 7 is that optical filter 11 is inserted in the light path that passes through erbium-doped fiber 5. This optical filter 11 is comprised of both the optical filter with the loss spectrum shape shown in FIG. 3 and the optical filter with the loss spectrum shape shown in FIG. 6 and is thus arranged as an optical filter with loss quantities corresponding to the respective wavelengths from the 1530 nm wavelength band to the 1560 nm wavelength band.

Figure 8:
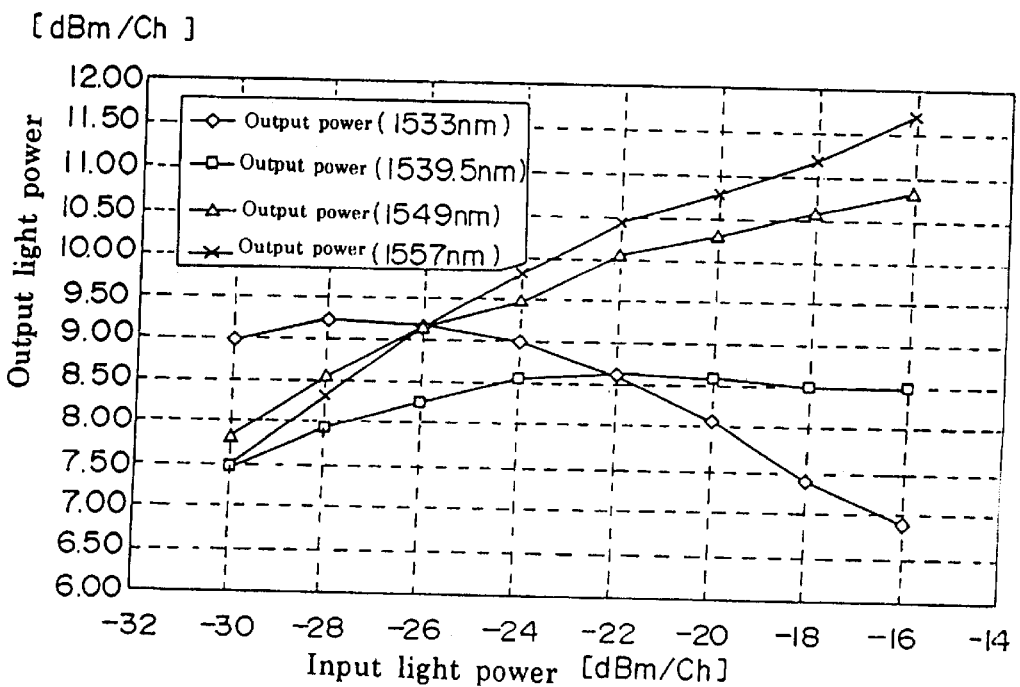
FIG. 8 is a graph which shows the differences in the output light power with respect to the input light power for a plurality of light signals of different wavelengths input into the optical amplifier of FIG. 7.
Figure 9:
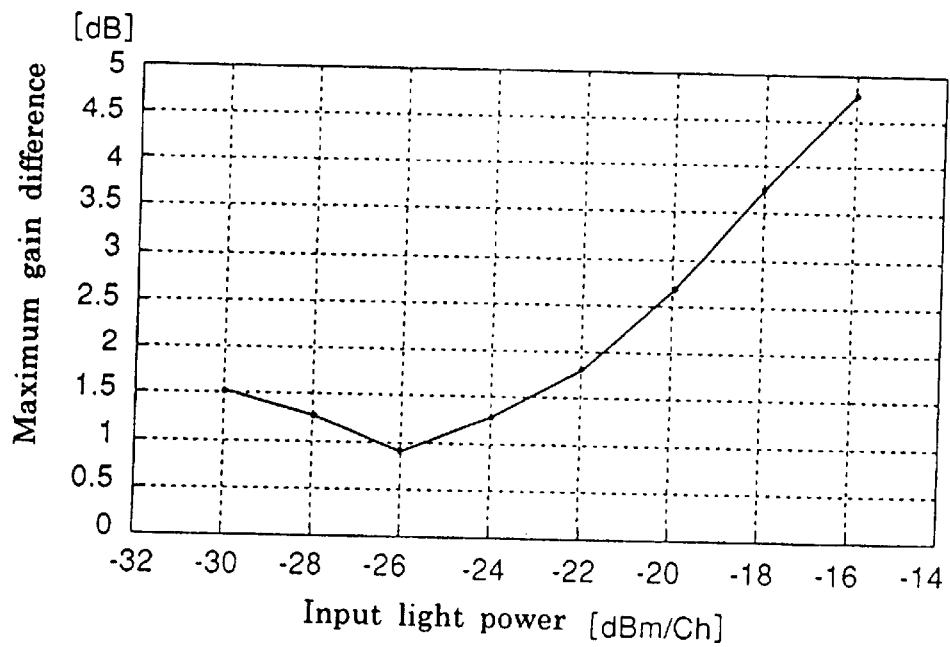
FIG. 9 is a graph which shows the differences in the maximum gain difference with respect to the input light power of the optical amplifier for a plurality of light signals of different wavelengths input into the optical amplifier of FIG. 7.

FIG. 8 shows the results of measured output power, on injecting the four light source to the input side of optical amplifier 4, assigning the respective light sources to the wavelengths of 1533 nm, 1539.5 nm, 1549 nm, and 1557 nm, multiplexing these signal light, and changing the input signal light power of each signal light from −16 dBm to −30 dBm. FIG. 9 shows the results of input signal light power dependence of gain difference.

Though these figures show that the gain of optical amplifier 4 depends on the wavelength of signal input light in case that the input light power of the signal light is varied, it can be seen that the maximum gain difference due to wavelength is extremely small, being less than 1 dB (approx. 0.93 dB) when the signal input light power is −26 dBm. This is because the loss spectrum of optical filter was decided upon setting the input power of the respective signal light input into optical amplifier 4 to −26 dBm, in manufacturing optical filter 11 by the optical filter manufacturing method of the present embodiment.

In other words, it has been confirmed from the results shown in FIGS. 8 and 9 that by setting the total power of a plurality of test input light equal to the total power of the actual communication input signals of a plurality of wavelengths used in wavelength division multiplex communication, determining the attenuation amounts in one-to-one correspondence with the respective wavelengths of the specified bands in the wavelength division multiplex communication band in the above condition, and manufacturing optical filter 11 upon setting the loss spectrum of optical filter 11 to have the loss spectrum characteristics of said attenuation amounts in one-to-one correspondence with the respective wavelengths, the problem of wavelength dependence of the gain of an optical amplifier 4 in wavelength division multiplex communication can be resolved to achieve the flatness of the gain.

Figure 10:
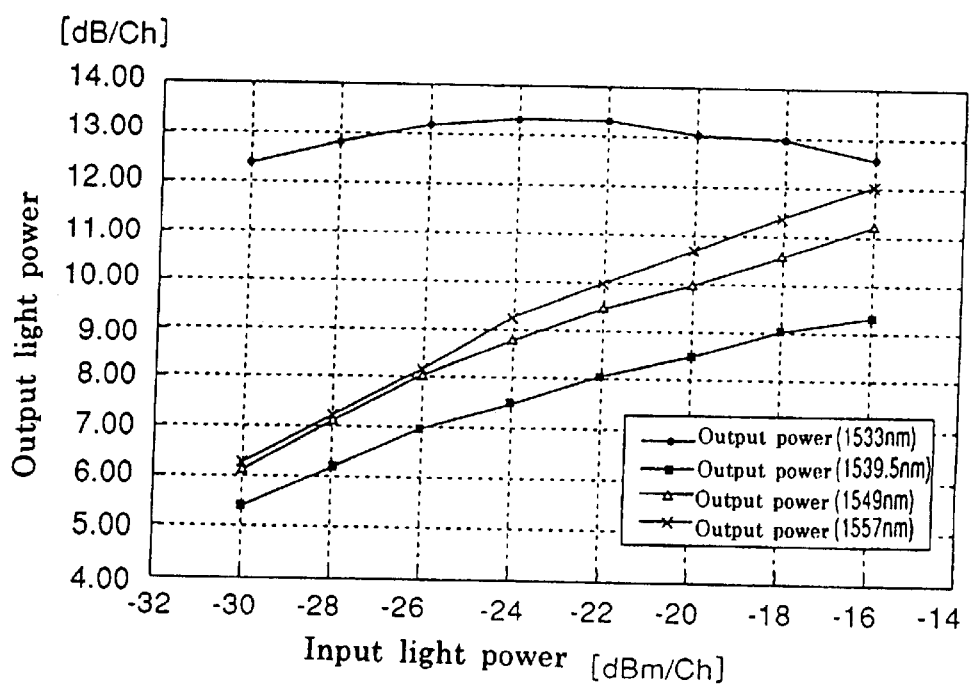
FIG. 10 is a graph which shows the differences in the output light power with respect to the input light power for a plurality of light signals of different wavelengths input into the optical amplifier of FIG. 7 with optical filter 11 omitted.
Figure 11:
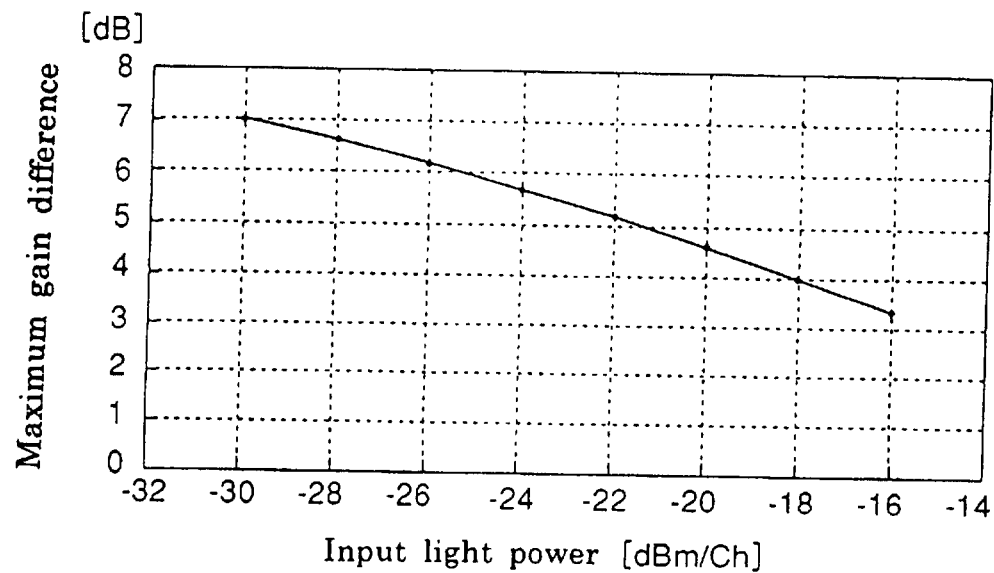
FIG. 11 is a graph which shows the differences in the maximum gain difference with respect to the input light power of the optical amplifier for a plurality of light signals of different wavelengths of FIG. 10 input into the optical amplifier of FIG. 7 with optical filter 11 omitted.
Figure 12:
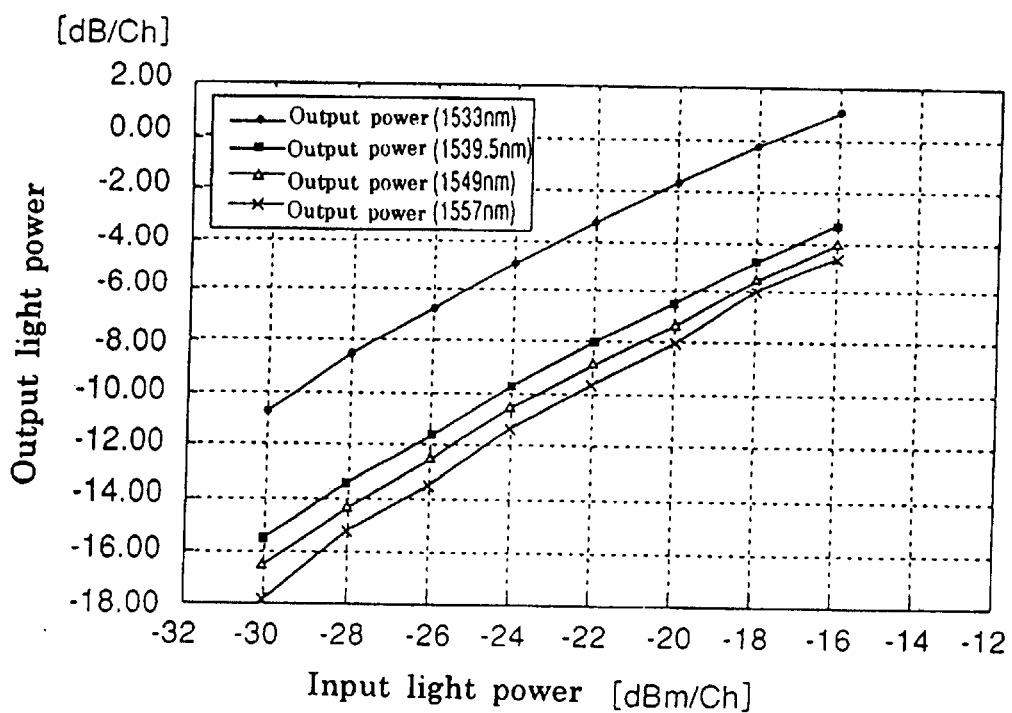
FIG. 12 is a graph which shows the differences in the output light power with respect to the input light power for a plurality of light signals of different wavelengths input into an example of a conventional optical amplifier without optical filter which is manufactured in this invention.
Figure 13:
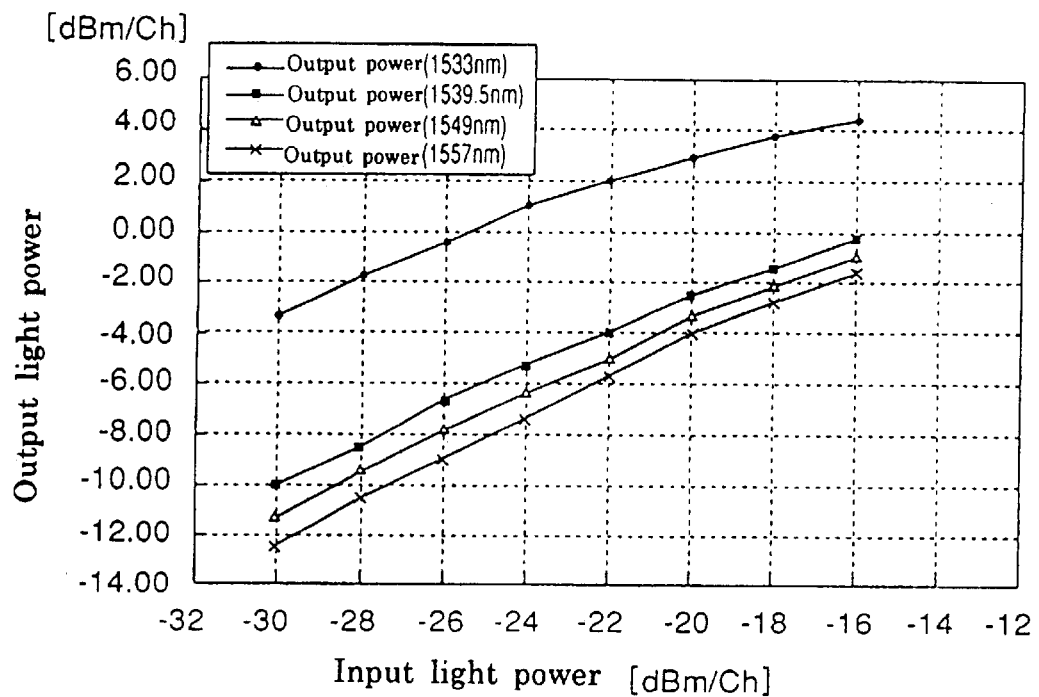
FIG. 13 is a graph which shows the differences in the output light power with respect to the input light power for a plurality of light signals of different wavelengths input into another example of a conventional optical amplifier without optical filter which is manufactured in this invention.
Figure 14:
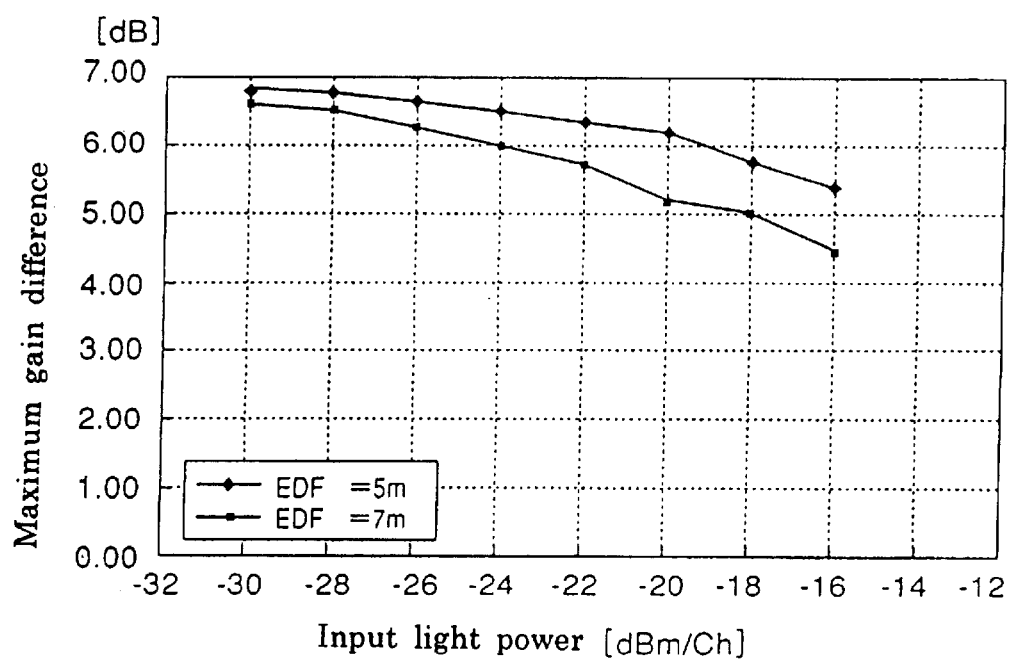
FIG. 14 is a graph which shows the differences in the maximum gain differences, resulting from different signal light wavelengths, of a conventional optical amplifier for input light power values that differ due to differences in the length of the erbium-doped fiber in the optical amplifier.

FIGS. 10 and 11 show for comparison the results of the measured signal output light power and the maximum gain difference, against the signal input power input into an optical amplifier 4 in the same manner as the above for an optical amplifier composed by omitting the optical filter 11 of optical filter 4 shown in FIG. 7. As is clear from these figures, in the case where optical filter 11 is not provided, the maximum gain difference when the signal input light power is −26 dBm becomes 6.17 dB, and it can be recognized that the wavelength dependence of the gain of optical amplifier 4 is extremely large.

The present invention is not limited to the embodiments described above and can take on various forms. For example, in the above embodiment, the loss spectrum of the optical filter was specifically set using the three types of simulation input light shown in FIG. 2 and a single probe light, the wavelength of which was varied at intervals of 0.5 nm. However, the (number of) types of simulation input light is not limited in particular as long as it is plural. Also, the wavelengths of the simulation input light are not limited in particular but are set suitably in correspondence to the wavelength of the probe light, and the wavelength of the probe light is not limited to being set at 0.5 nm intervals as in the embodiment described above but can be set at a suitable, desired wavelength interval. Furthermore, the input light may be such that it has an oscillation spectrum of a wide band such as, for example, ASSE (Amplified Spontaneous Emission).

Also, although light source 1m for the probe light in the embodiment described above was a tunable wavelength light source, light source 1m is not limited to a tunable wavelength light source, and DFB (distributed-feedback) laser can be applied to the probe light. Or, a plurality of probe light sources can be prepared and the optical filter loss spectrum can be determined in the same manner as the embodiment described above by reconnecting the probe light source each time when an attenuation amount corresponding to a particular wavelength is to be determined.

Furthermore, although the input signal light power input into optical amplifier 4 in the process of determining the optical filter loss spectrum, was set to −26 dBm in the embodiment described above. This input signal light power is not limited in particular, but it is set to match the power used in the actual communication system so that the total power of a plurality of test input light will be equal to the total power of the plurality of actual communication light signals used in wavelength division multiplex communication system.

Furthermore, although the input signal light power input into optical amplifier 4 in the process of determining the optical filter loss spectrum, was set to −26 dBm in the embodiment described above. This input signal light power is not limited in particular, but it is set to match the power used in the actual communication system so that the total power of a plurality of test input light will be equal to the total power of the plurality of actual communication light signals used in wavelength division multiplex communication system. The output power of pump source and the output signal light power of optical amplifier are also assigned to the power equal to the value of actual communication systems.

Furthermore, in the abovementioned embodiment, although the attenuation amount in one-to-one correspondence to the respective wavelengths of the specified bands in the wavelength multiplex transmission band is obtained so that the output power outputted from the optical amplifier 4 of the probe light becomes Pmin<Pout($\lambda$m)<Pmax in a range between the maximum and the minimum values of the simulation input light power outputted from the optical amplifier 4 when setting the loss spectrum of an optical filter, a smaller set range than the range between the maximum and the minimum values of the simulation input light power outputted from the optical amplifier 4 may be defined therein, and the abovementioned attenuation amount may be obtained, as described above, so that the output power outputted from the optical amplifier 4 of the probe light moves into the set range. Furthermore, a setting value is set in a range of the simulation input light output power outputted from the optical amplifier 4, and the attenuation amount may be obtained, as described above, so that the output power outputted from the optical amplifier 4 of the probe light becomes the setting value.

Also, a preset value within the range defined by the maximum and minimum of the output power from the optical amplifier 4 which corresponds to the amplified simulation input light (Pmin<Pout ($\lambda$m)<Pmax), can be set, and the attenuation amounts can be determined by variably adjusting the attenuation in the same manner as that described above so that the amplified probe light will be equal to this preset value.

Furthermore, although an optical filter 11 was applied between erbium-doped fibers 5 of an optical amplifier 4 with two pump sources 8a and 8b, and the method of manufacturing the optical filter was described in the above embodiment, optical filter 11 can also be inserted in a single-mode fiber connected to an erbium-doped fiber 5. The details of the arrangement of pump source 8, etc. used in optical amplifier 4 are not restricted in particular, but are set suitably. That is, the wavelength dependence problems of gain in optical amplifier 4, can be solved as in the embodiment described above by manufacturing an optical filter upon setting the loss spectrum of an optical filter 11 in the optical amplifier 4 to be used for wavelength division multiplex communication systems, and by applying the optical filter 11 manufactured thus to the optical amplifier 4.

Applicability to Industry

As has been described above, the optical filter by the present invention and the optical amplifier which uses said optical filter are suitable for use in an optical communication system in which wavelength division multiplex communication is performed.

What is claimed is:

1. A method of manufacturing an optical filter to be used in an optical amplifier equipped with an erbium-doped fiber that is excited by an pump light source, in a wavelength division multiplex transmission system comprising the steps of: setting the input signal light power of the optical amplifier, output power of the pump light source, and output signal light power of the optical amplifier respectively, to power values used during operation in a communication system and setting the total power of a plurality of test input light, which includes simulation input light of a plurality of wavelengths and input light of one of the wavelengths in the communication band of the wavelength division multiplex transmission system, equal to the total power of communication input signals of a plurality of wavelengths used in the wavelength division multiplex transmission system, obtaining an attenuation amount in one-to-one correspondence to the respective wavelengths of the specified bands in a wavelength multiplex transmission band so that the output power goes into the setting power values; and setting a loss spectrum to become a loss spectrum of the attenuation amount in one-to-one correspondence to the respective wavelengths of the communication band.

2. An optical filter manufactured by the manufacturing method of claim 1.

3. An optical amplifier for wavelength division multiplex communication which uses an erbium-doped fiber excited by an pumping light source, wherein the optical filter of claim 2 is inserted in the light path that passes through the erbium-doped fiber.

4. An optical amplifier for wavelength division multiplex communication systems which uses an erbium-doped fiber excited by an pumping light source, wherein a single-mode optical fiber is connected to the erbium-doped optical fiber and the optical filter of claim 2 is inserted in this single-mode optical fiber.

5. A method for manufacturing an optical filter as set fourth in claim 1, wherein the respective power values of the test input light signals are equal to each other.

6. A method for manufacturing an optical filter as set fourth in claim 1, wherein a number of test input light signals is equal to the number of using light signals in transmission.

7. A method for manufacturing an optical filter as set in claim 5, wherein a number of test input light signals is equal to the number of using light signals in transmission.

8. A method for manufacturing an optical filter as set in claim 1, wherein the test input light has an oscillation spectrum in a wide band.

* * * * *

UNITED STATES PATENT AND TRADEMARK OFFICE
CERTIFICATE OF CORRECTION

PATENT NO. : 6,198,570 B1
DATED : March 6, 2001
INVENTOR(S) : Fukushima et al.

It is certified that error appears in the above-identified patent and that said Letters Patent is hereby corrected as shown below:

Title page,
Item [30], Foreign Application Priority Data "Apr. 5, 1996" should be corrected to read -- Apr. 25, 1996 --.

Drawing,
Sheet 5 of 8, reference numeral 15 "Light input" should read -- Light output --.

Column 8,
Line 6, "wavelengths of the are" should read -- wavelengths are --.

Column 10,
Line 43, "ASSE" should read -- ASE --.

Column 12,
Line 10, "by an pump" should read -- by a pump --
Line 34, "by an pumping" should read -- by a pumping --.
Line 39, "by an pumping" should read -- by a pumping --.

Signed and Sealed this

Sixth Day of November, 2001

Attest:

*Attesting Officer*

NICHOLAS P. GODICI
*Acting Director of the United States Patent and Trademark Office*